Jan. 16, 1945. A. H. AHRNDT 2,367,552
TOOL
Filed Aug. 1, 1942
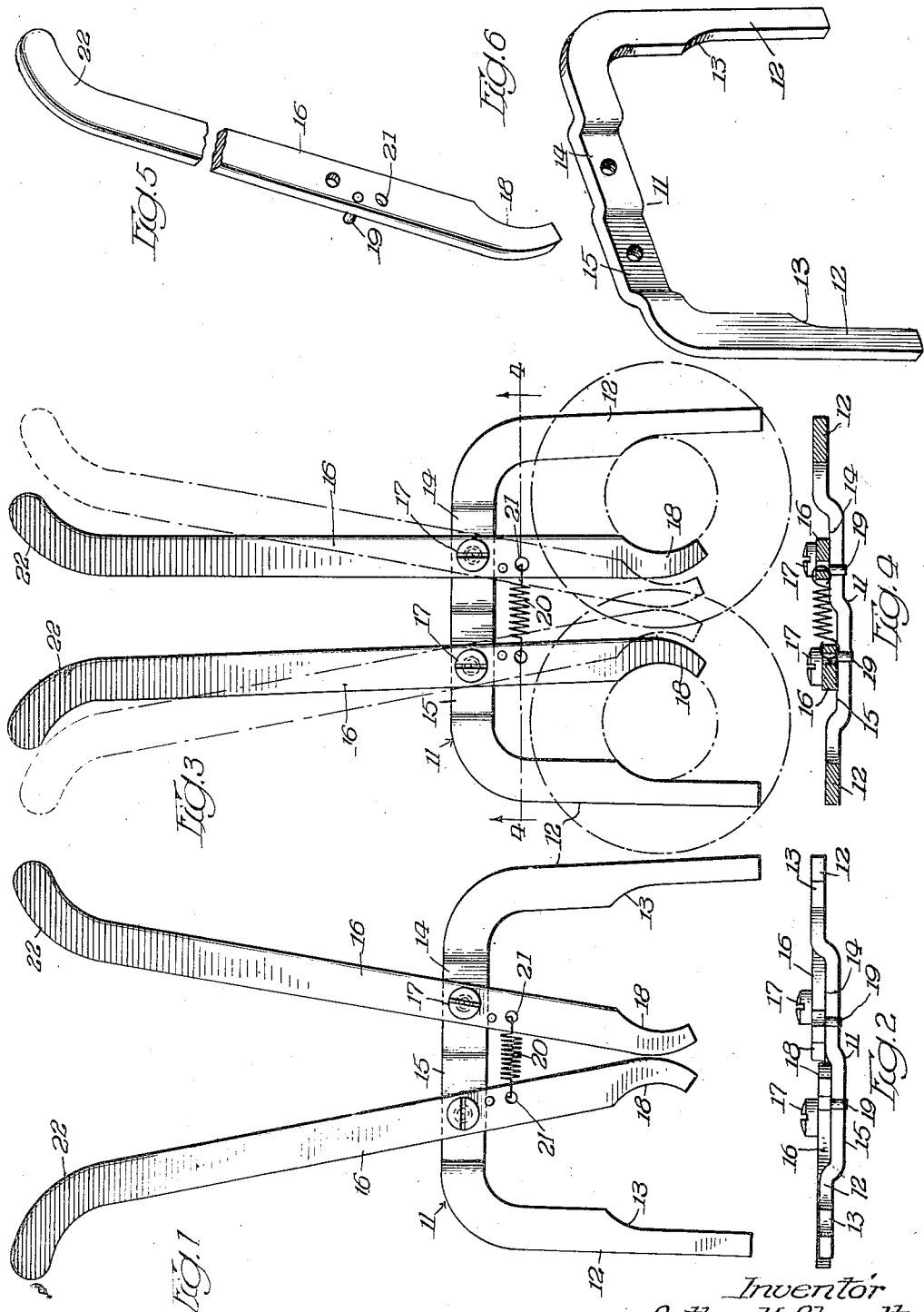
Inventor
Arthur H. Ahrndt
By Spencer Marzall Johnston & Cook Attys Patented Jan. 16, 1945

2,367,552

UNITED STATES PATENT OFFICE 2,367,552

TOOL

Arthur H. Ahrndt, La Porte, Ind., assignor to U. S. Slicing Machine Company, La Porte, Ind., a corporation of Indiana Application August 1, 1942, Serial No. 453,222

9 Claims. (Cl. 294—87)

This invention relates to a tool for moving and lifting objects having sharp projections or cutting edges.

An object of this invention is to provide safe, simple and efficient means for moving and lifting machine parts having sharp projections or cutting edges, particularly for simultaneously removing from a machine a plurality of cutting means thereof, such as the knife shaft assemblies of the food tendering machine shown and described in applicant's co-pending application Serial No. 455,561, filed August 21, 1942, without bringing the hands of a person directly in contact with the parts, thus avoiding injury to, and soiling of the person.

Additional objects, advantages and capabilities inherent in this invention will become readily apparent from the description thereof which follows.

This invention further resides in the combination, construction and arrangement of parts illustrated in the accompanying drawing which shows a selected embodiment of the invention.

In the drawing:

Fig. 1 is a plan view of the tool with the gripping members or tongs in open position;

Fig. 2 is an end view of the tool as shown in Fig. 1 with the tongs in open position;

Fig. 3 is a view of the tool with the tongs in closed or gripping position with respect to a pair of knife shafts indicated by dashed lines;

Fig. 4 is a section along the line 4—4 of Fig. 3;

Fig. 5 is a perspective view of one of the tongs shown in Fig. 1; and

Fig. 6 is a perspective view of the frame shown in Fig. 1.

The particular arrangement herein shown for the purpose of illustrating the invention, comprises a frame 11 which is substantially U-shaped and has outwardly extending, spaced arms 12, with their ends shaped as at 13 to accommodate the object or objects to be moved. The central portion of frame 11 is shaped as at 14, 15 to receive gripping members or tongs 16 in approximately the same plane as arms 12; each of the tongs 16 being disposed in opposition to one of the arms 12. As shown, the portion 15 is depressed or offset somewhat more than the portion 14 so that one of the tongs 16, which is pivoted to frame 11 at 17, will be slightly offset and will be operable in a plane slightly removed from the plane in which the other is operable, and the opposed arm 12 is correspondingly arranged. This is particularly advantageous in moving objects such as the knife assemblies in the machine above mentioned, in which the knives of one shaft are disposed intermediate the knives of another shaft, as illustrated in dashed lines in Fig. 3, and it is desirable to remove the two shafts simultaneously, the offset of the frame and the tongs being correlated with the offset of the knives on the two shafts.

Tongs 16 have their outer or forward ends 18 which oppose the shaped ends 13 of arms 12 so shaped and proportioned as to cooperate with the ends 13 and facilitate the gripping of particular objects, such as the knife shaft assemblies above mentioned and diagrammatically illustrated in Fig. 3 of the drawing. In the illustrated tool the ends 18 of the tongs comprise arcuate surfaces adapted to extend part way around a knife shaft or the like and so positioned as properly to cooperate with inwardly directed, arcuate shoulders provided on the arms 12. Tongs 16 also are provided with pins 19 which are positioned and arranged so as to engage one side of the central portion of frame 11 and thus limit the inward movement of the tongs as desired. Spring 20 connected with tongs 16 by means of holes 21, normally holds the tongs together, that is, in open position. Handle portions 22 of tongs 16 may be of any convenient length, and shape.

The construction of the tool is such that the parts will normally be in the position shown in Fig. 1. In operation the handles 22 may be grasped with one hand, and the ends 13 of arms 12 and ends 18 of tongs 16 positioned about the object or objects to be moved or lifted. The shaped ends 13 of the arms 12 include elongated, substantially straight portions which extend downwardly beneath the arcuate shoulders of the arms and serve as guides to permit the tool readily to be inserted between the blades or knives of a knife shaft assembly or the like. Handles 22 are then pressed together until the object is firmly gripped by the ends 18 of the tongs against the ends 13 of arms 12, after which the object may be moved or lifted as desired, without bringing the hands into direct contact with the object.

Changes may be made in the form, construction and arrangement of the parts without departing from the spirit of the invention, and the right is hereby reserved to make all such changes as fairly fall within the scope of the following claims.

The invention is hereby claimed as follows:

1. A tool of the character described comprising a frame having a plurality of spaced arms in opposed relation, a plurality of spaced tongs pivotally mounted on said frame intermediate said arms, each of said tongs being operable to exert a gripping force in a direction toward a mating one of said arms, resilient means connecting said tongs and acting normally to hold corresponding ends of said tongs in spaced relation with respect to said arms, and means limiting the movement of said corresponding ends of said tongs toward each other.

2. A tool of the character described comprising a frame having a plurality of spaced arms in opposed relation, a plurality of spaced tongs pivotally mounted on said frame intermediate said arms, each of said tongs being operable to exert a gripping force in a direction toward a mating one of said arms, resilient means connecting said tongs and acting normally to hold corresponding ends of said tongs in spaced relation with respect to said arms, and means limiting the movement of said corresponding ends of said tongs toward each other, the frame and tongs being of such conformation that one arm and the tong opposed thereto are operable in a plane different from that in which another arm and the tong opposed thereto are operable.

3. A tool of the character described comprising a frame having a plurality of spaced arms in opposed relation, a plurality of spaced tongs pivotally mounted on said frame intermediate said arms, each of said tongs being operable to exert a gripping force in a direction toward a mating one of said arms, resilient means connecting said tongs and acting normally to hold corresponding ends of said tongs in spaced relation with respect to said arms, means limiting the movement of said corresponding ends of said tongs toward each other, the frame and tongs being of such conformation that one arm and the tong opposed thereto are operable in a plane different from that in which another arm and the tong opposed thereto are operable, said arms and said tongs having cooperating gripping portions adapted to engage opposite sides of an article to be gripped, and said arms having extensions projecting beyond the gripping portions thereof to provide guide fingers for facilitating application of the tool to an article.

4. A tool of the character described comprising a frame having a pair of spaced arms in opposed relation, a pair of movable gripping members pivotally mounted on said frame between said arms, said members being pivoted intermediate their ends to provide gripping portions extending in opposed relation with respective ones of said arms and handle portions for operating the members to exert gripping forces in directions toward the said opposed arms, spring means operative upon said members for normally drawing each of said gripping portions away from its opposed arm, and means secured to each of said members and adapted to engage said frame to limit movement of said gripping portions under action of said spring means.

5. A tool of the character described comprising a frame having a pair of spaced arms in opposed relation, a pair of movable gripping members pivotally mounted on said frame between said arms and having gripping portions extending in opposed relation with respective ones of said arms, each of said members being operable to exert a gripping force in a direction towards the arm opposed to its gripping portion, spring means operative upon said members for normally drawing each of said gripping portions away from its opposed arm, and means limiting movement of said gripping portions under action of said spring means.

6. A tool of the character described comprising a frame having a plurality of spaced arms in opposed relation, a plurality of movable gripping members pivotally mounted on said frame and having gripping portions extending in opposed relation with respective ones of said arms, each of said members being operable to exert a gripping force in a direction towards the arm opposed to its gripping portion, and the gripping portion of one of said members and its co-operating arm being disposed for operation in a plane different from that of the gripping portion of another of said members and its co-operating arm.

7. A tool of the character described comprising a frame having a plurality of spaced arms in opposed relation, a plurality of movable gripping members pivotally mounted on said frame between said arms and having gripping portions extending in opposed relation with respective ones of said arms, each of said members being operable to exert a gripping force in a direction towards the arm opposed to its gripping portion, and the gripping portion of one of said members and its cooperating arm being disposed for operation in a plane different from that of the gripping portion of another of said members and its cooperating arm.

8. A tool of the character described comprising a frame having a plurality of spaced arms in opposed relation, a plurality of movable gripping members pivotally mounted on said frame between said arms and having gripping portions extending in opposed relation with respective ones of said arms, each of said members being operable to exert a gripping force in a direction towards the arm opposed to its gripping portion, and the gripping portion of one of said members and its cooperating arm being both offset with respect to the gripping portion of another of said members and its operating arm for operation in different planes.

9. A tool of the character described comprising a frame having a plurality of spaced arms in opposed relation, a plurality of movable gripping members pivotally attached to said frame on spaced pivots and having gripping portions extending in opposed relation with respective ones of said arms, each of said members being operable to exert a gripping force in a direction towards the arm opposed to its gripping portion, a plurality of said arms being offset to lie in different planes, and said frame having offset portions providing for operation of each of said gripping members in substantially the same plane as its cooperating arm.

ARTHUR H. AHRNDT.